(12) United States Patent
Jayasuriya et al.

(10) Patent No.: US 7,800,545 B2
(45) Date of Patent: Sep. 21, 2010

(54) PORTABLE SATELLITE TERMINAL

(75) Inventors: Rajanik Mark Jayasuriya, Singapore (SG); Yoong Eng Christopher Hu, Singapore (SG); Gang Liu, Singapore (SG); Sandrasegaram Pillai Sivakumar, Singapore (SG); Jianhua Zheng, Singapore (SG)

(73) Assignee: ST Electronics (Satcom & Sensor Systems) Pte Ltd, Singapore (SG)

( * ) Notice: Subject to any disclaimer, the term of this patent is extended or adjusted under 35 U.S.C. 154(b) by 732 days.

(21) Appl. No.: 11/662,766

(22) PCT Filed: Feb. 16, 2005

(86) PCT No.: PCT/SG2005/000039

§ 371 (c)(1),
(2), (4) Date: Mar. 14, 2007

(87) PCT Pub. No.: WO2006/031201

PCT Pub. Date: Mar. 23, 2006

(65) Prior Publication Data

US 2007/0252765 A1 Nov. 1, 2007

(30) Foreign Application Priority Data

Sep. 14, 2004 (SG) ................................ 200405953

(51) Int. Cl.
*H01Q 1/24* (2006.01)

(52) U.S. Cl. ........................ 343/702; 343/757; 343/872; 343/882

(58) Field of Classification Search ....................... None
See application file for complete search history.

(56) References Cited

U.S. PATENT DOCUMENTS

| 5,819,185 | A | * | 10/1998 | Umezawa et al. | ......... | 455/575.1 |
| 5,918,163 | A | * | 6/1999 | Rossi | ........................ | 455/558 |
| 6,052,364 | A |   | 4/2000 | Chalmers et al. | | |
| 6,163,302 | A | * | 12/2000 | Bjorkengren et al. | ....... | 343/702 |
| 6,172,645 | B1 | * | 1/2001 | Hollander et al. | ........... | 343/702 |
| 6,419,506 | B2 | * | 7/2002 | Jones et al. | .................. | 439/131 |
| 6,577,279 | B1 | * | 6/2003 | Shoji et al. | .................. | 343/702 |
| 7,269,393 | B2 | * | 9/2007 | Ota et al. | .................... | 455/90.3 |
| 7,403,164 | B2 | * | 7/2008 | Sanz et al. | .................. | 343/702 |
| 2003/0092381 | A1 |   | 5/2003 | Buel et al. | | |

FOREIGN PATENT DOCUMENTS

WO  WO 99/39160  8/1999

* cited by examiner

*Primary Examiner*—Trinh V Dinh
(74) *Attorney, Agent, or Firm*—Jacobson Holman PLLC

(57) ABSTRACT

A portable satellite antenna terminal, comprising a body (620) and a unit (637) within the body (620) for controlling the terminal and terminal functions. Also provided is an antenna (607) mounted to the body (620) for movement (633, 635) relative thereto. The antenna (607) is able to be stowed within the body (620) when not in use. The antenna (607) may be a flat panel antenna (624) and is moveable relative to the body (620) from a stowed position to an in-use position.

22 Claims, 8 Drawing Sheets

PORTABLE SATELLITE TERMINAL

FIELD OF THE INVENTION

The present invention relates to a portable satellite terminal and refers particularly, though not exclusively, to a portable satellite terminal for satellite communication that is able to send, receive, or both send and receive, data to and from stations in a satellite communication system. The invention may be implemented as a portable satellite terminal operated by one person or a mobile satellite terminal able to be mounted on a vehicle, a vessel or a building.

REFERENCE TO RELATED APPLICATION

This application is a 371 application of PCT/SG05/00039 filed Feb. 06, 2005, and claims the benefit of the earlier Singapore Application No. 200405953-1 filed Sep. 14, 2004. Reference is made to our co-pending Singapore patent application number 200307498-6 filed 15 Dec. 2003 for "Digital Communication System and Method" (the "earlier application") the contents of which are hereby incorporated by reference.

BACKGROUND OF THE INVENTION

In satellite communication, a mobile terminal is required for communication services such as voice, data, Internet access, remote control, video conferencing, video streaming, and so forth. Such a terminal is preferably small enough to be portable, be able to support a reasonably high data rate, be easy to set-up, and conforms to the general regulations relating to satellite transmissions.

Present products address the requirement of portability by using a smaller antenna (typically a dish antenna 1.8 m in diameter for C-Band satellite communication) but thereby compromise the quality of the link. The design of small size antenna for any given frequency band become quite difficult because the level of interference and system noise become unacceptable when the antenna is small, and it will be difficult to conform to the regulations relating to satellite transmission. For example: for the C-Band frequency band, the smallest practical antenna presently available is a 1.8 m diameter dish antenna. This sets the limits on the size and weight of the terminal system.

When the terminal is being stowed, a typical antenna will need to be disassembled and placed in a number of boxes. The combined weight is quite heavy. For a 1.8 m diameter C-band antenna, it is typically in the region of 100 kg. In certain low data rate applications, where the terminal size is more important than data rate, a smaller antenna is used. However, the antenna gain is compromised. To compensate for the lower antenna gain, a higher power transceiver is employed. Such transceivers are more expensive, heavier, and have a higher power consumption. When higher power transmission is used with a small antenna, it may violate the off-axis emission regulations.

Some products attempt to satisfy the requirement for a reasonably high data rate by increasing antenna size, thus compromising the other two requirements (being portable, and easy to set-up). This makes the terminal even heavier. Normally, it needs at least two people to set up the terminal, and the setup may take longer time.

Although there is significant interest in the use of communication satellites for mobile application, the limitations in providing a truly portable satellite terminal that can provide good quality services has not thus far been able to be overcome. Therefore, there is a significant need for a portable terminal that is compact, easy to set-up, and provides a reasonably high data rate

SUMMARY OF THE INVENTION

In accordance with a preferred aspect there is provided a portable satellite terminal comprising a body, a unit within the body for controlling terminal and terminal functions, and an antenna mounted to the body for movement relative thereto. The antenna is able to be stowed within the body when not in use.

There may also be a cover for the body to enclose the stowed antenna. The antenna may be stowed in its in-use condition and may not require folding to be stowed within the body and the cover. The antenna may also be stowed in its in-use condition and may not require disassembly to be stowed within the body and the cover. Alternatively, the antenna may be folded and/or dismantled prior to being stowed. The antenna may be a flat panel antenna, and may be active or passive.

The terminal may further include one or more of: a bubble level, a compass, and at least one height-adjustable leg.

The antenna may be moveable relative to the body from a stowed position to an in-use position. When the antenna is in the in-use position it may be adjustable for elevation and azimuth. The antenna may be mounted on an antenna plate, the antenna plate being mounted on a rod that is rotatable for adjustment of elevation. The rod may be mounted on a support plate rotatably mounted relative to the body for azimuth adjustment.

There may be at least one antenna swing arm connected to the antenna plate and operatively connected to the rod. The support plate may be mounted on a mounting block, and the mounting block mounted on the body, for enabling the rotational movement of the mounting plate for azimuth adjustment.

The unit may be removable from the body. The unit may include one or more of: a global positioning satellite receiver, a high stability clock, a digital modem, a handset, a display, a keypad, a battery, and a fan. The digital modem may be a spread spectrum modem, and the unit may have a splashproof or waterproof casing.

The cover may be hingedly attached to the body. The body, with or without the cover, may also act as a stabilizer for the antenna when the antenna is in the in-use position.

The terminal may also include an RF transceiver, a microcontroller, a router, and a physical communication interface.

The terminal may accommodate the C-band and Ku-band frequency ranges.

In another aspect there is provided a portable satellite terminal comprising:

(a) a body;

(b) a cover for the body;

(c) a unit in the body for controlling the terminal and the terminal functions; and (d) an antenna for storage within the assembly of the body and the cover;

wherein, the terminal has a weight of less than 25 kg and the cover has a top surface area of less than 2 square meters.

The weight may be in the range 0.8 kg to 20 kg, preferably 2.5 to 8 kg, more preferably 6 kg.

The top surface area may be in the range 0.06 to 2 square meters, and is preferably in the range 0.2 m×0.3 m to 1.21 m×1.66 m, more preferably 0.4 m×0.55 m. The height of the terminal may be in the range 0.08 m to 0.18 m, preferably 0.16 m.

The terminal may have an RF transmission power in the range 0.25 W to 18 W, preferably 0.5 W to 8 W, more preferably 5 W.

According to a third aspect there is provided a portable satellite terminal comprising a global positioning satellite receiver and a high stability clock, the global positioning satellite receiver being used to provide a timing reference for the high stability clock for enabling the high stability clock to generate a precise clock signal.

BRIEF DESCRIPTION OF THE DRAWINGS

In order that the invention may be better understood and readily put into practical effect, there shall now be described by way of non-limitative example only preferred embodiments of the present invention, the description being with reference to the accompanying illustrative drawings in which.

DETAILED DESCRIPTION OF THE PREFERRED EMBODIMENTS

Figure 1:
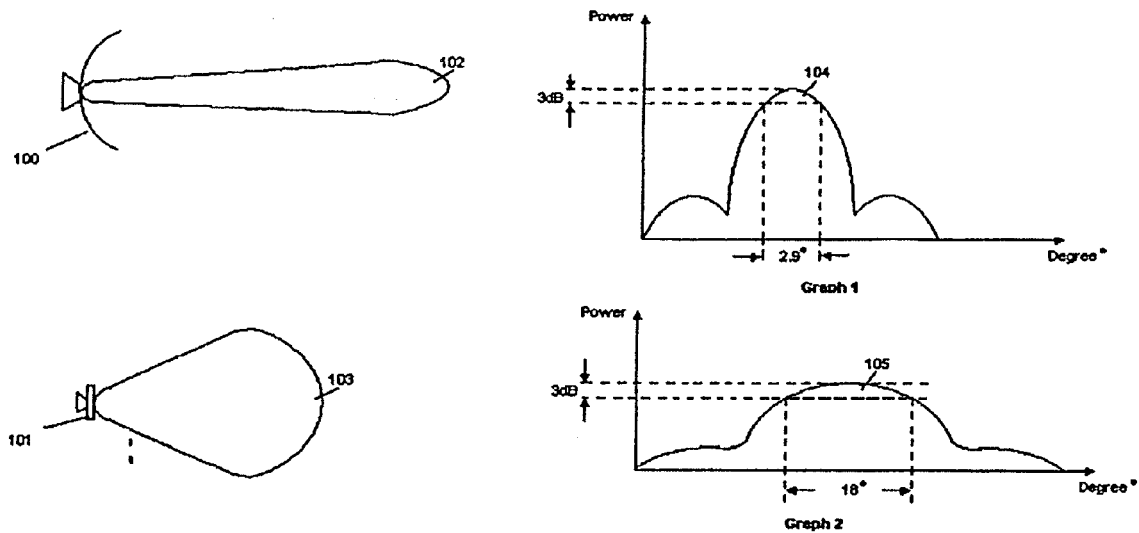
FIG. 1 is an illustration of two forms of known antennas and their performance.

Throughout the drawings like reference numerals are used for like components but with a prefix number indicating the drawing figure.

To first refer to FIG. 1, there is shown a narrow beam-width antenna 100 that makes it more difficult to point the antenna 100 to a satellite due to its narrow beam 102. Graph 1 of FIG. 1 illustrates the beam width of a narrow beam width antenna. It shows that the narrow beam antenna 100 has a 3 dB beam width 104 of about 2.9 degrees while Graph 2 of FIG. 1 shows the wide beam antenna 101 with a wide beam 103 has a 3 dB beam width 105 of about 18 degrees.

The beam width employed depends on the antenna being used. In a preferred embodiment, it may range from 8 to 360 degrees, preferably from 10 to 60 degrees, and more preferably is 18 degrees.

Figure 2:
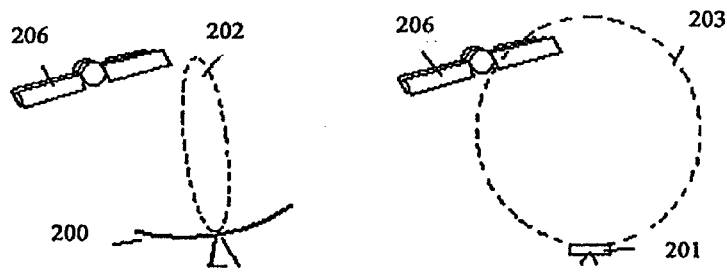
FIG. 2 is an illustration of the consequences of the antennas of FIG. 1 being inaccurately pointed at a satellite.

FIG. 2 shows the difference in the effort to point a narrow beam-width antenna 200 versus a wide beam width antenna 201. A small angle of misalignment of the narrow beam 202 will causes the narrow beam antenna 200 (1.8 m, in this example) to miss the satellite 206. The same misalignment angle on the wide beam 203 of the wide beam antenna 201 will still have the desired satellite 206 within its 3 dB-beam width 203.

For portability, it is preferred to use a small antenna. The antenna may be of any type, depending on the antenna gain and application requirements. However, a flat panel active antenna is preferred as it assists in making the terminal compact and lightweight.

Figure 3:
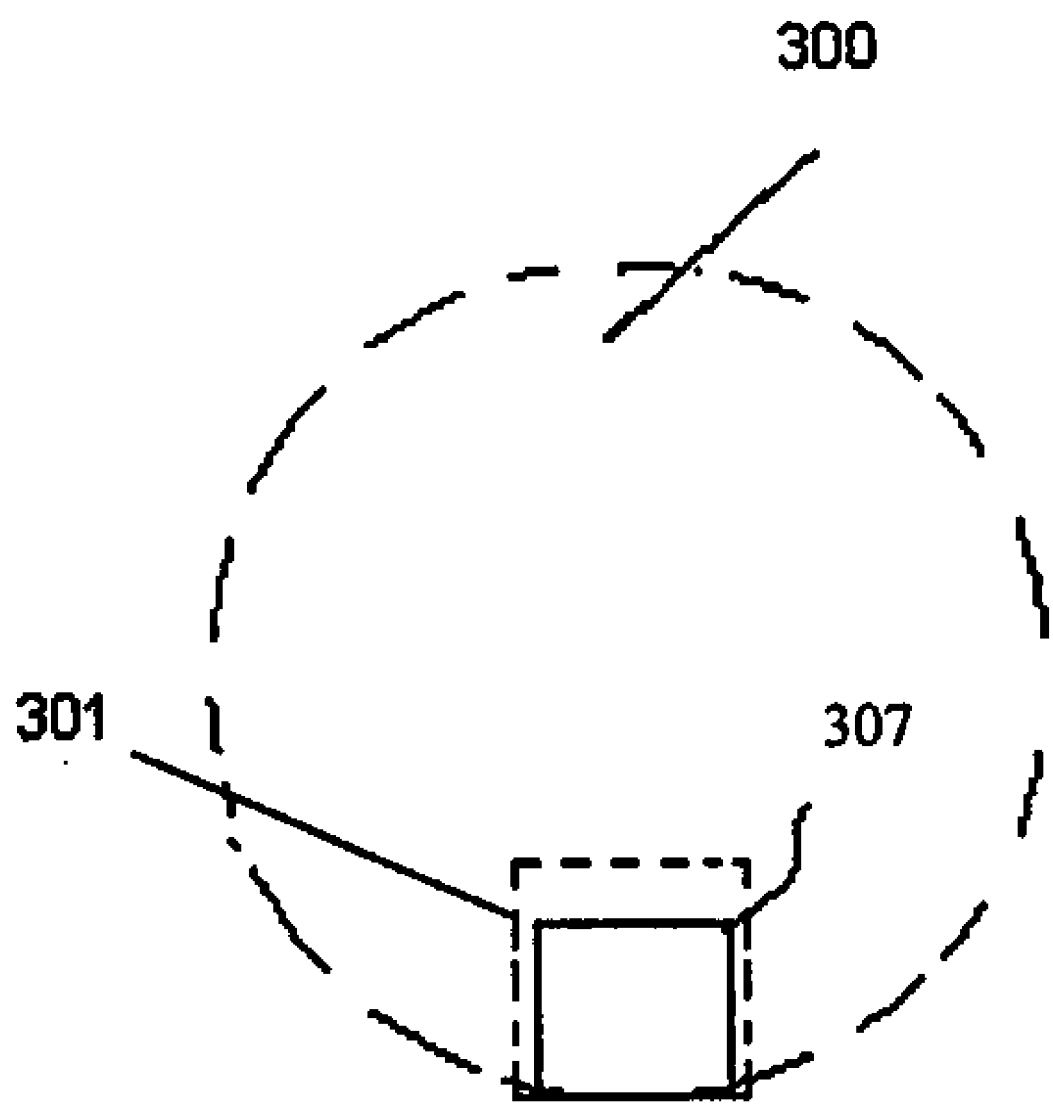
FIG. 3 illustrates relative sizes of different antennas.

FIG. 3 illustrates the size of a typical 1.8 m antenna 300, a flat antenna 301, and a preferred antenna 307 according to the present embodiment. The antenna 307 has a wide beam width.

In contrast to the prior art terminals described above, by using a preferred embodiment of the present invention the case of the terminal may have a top surface area of less than 2 square meters, preferably in the range 0.06 to 0.3 square meters, more preferably 0.22 square meters. This area may be represented by the top surface area having dimensions in the range 0.06 to 0.3 square meter, and is preferably in the range 0.2 m×0.3 m to 1.21 m×1.66 m, more preferably 0.4 m×0.55 m. The height of the terminal may be in the range 0.08 m to 0.18 m, preferably 0.16 m. The weight of the terminal may be less than 25 kg, preferably in the range 0.8 to 20 kg, more preferably 2.5 kg to 8 kg, and further more preferably 6 kg.

This is significantly smaller (<20%) in size and significantly lighter (<25%) than prior art terminals. The cover should be able to accommodate the antenna 307 without the antenna 307 being folded or dismantled. However, if a higher gain antenna is required or desired, the antenna 307 may need to be bigger and may be foldable or dismantlable to fit within the terminal case. The height of the case may be in the range 80 mm to 180 mm, preferably 160 mm.

Preferably, transmitted data is spread and received data is de-spread using spectrum-spreading method and apparatus as disclosed in the earlier application. In this way, it is possible to reduce interference from adjacent satellites.

Figure 4:
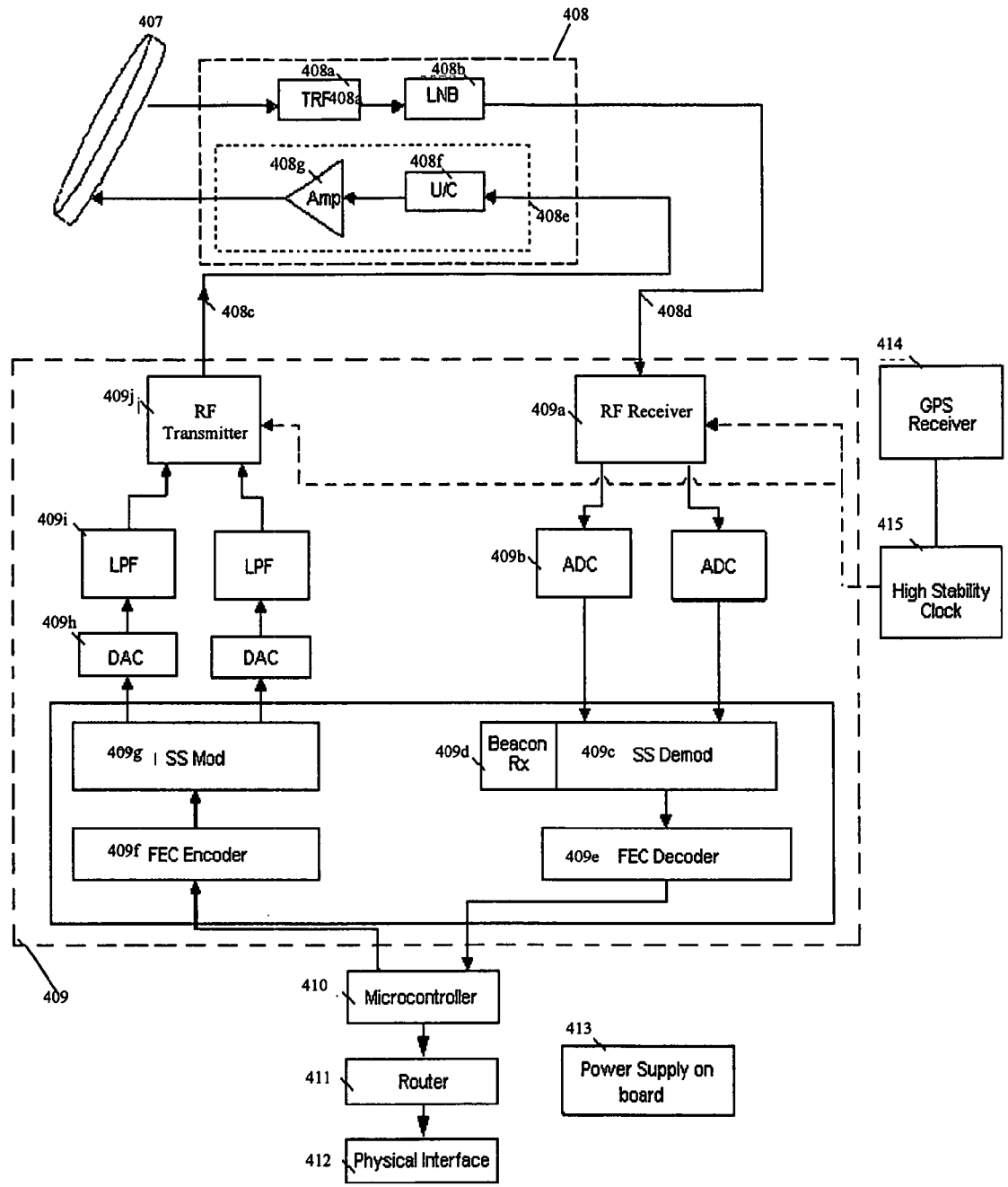
FIG. 4 illustrates one example of preferred circuitry.

FIG. 4 shows a preferred embodiment of the circuitry for a portable satellite terminal. The portable satellite terminal may consist of:
1. an antenna system 407;
2. a transceiver system 408;
3. a spread spectrum modem 409;
4. a micro controller 410;
5. a data terminal equipment 411 such as router, bridge, and so forth;
6. a communication interface 412;
7. an on-board power supply 413;
8. a global positioning satellite (GPS) receiver 414; and
9. a high-stability clock 415.

The power supply 413 may be a battery and/or an AC supply and/or a DC supply.

With this embodiment, data and voice communication can be realized over a satellite radio link. For example, a telephone call can be made. When transmitting call data packets are transferred from the telephone to the terminal via the communication interface 412, then accepted by data terminal equipment 411, and processed by micro controller 410. Subsequently, data is encoded by forward correction code ("FEC") encoder 409$f$, spread by the spread spectrum modulator 409$g$, then converted to an analogue signal by digital-to-analogue converter ("DAC") 409$h$. The analogue signal is filtered by a low pass filter ("LPF") 409$i$, and further modulated with a carrier signal using a desired modulation scheme by RF transmitter 409$j$ to produce modulated signal IFUP 408$c$. The modulated signal IFUP 408$c$ is converted by the up converter 408$f$ of the block up converter ("BUC") 408$e$ to the desired transmission RF frequency, and further amplified to the required transmission power by an amplifier 408$g$. It is then sent to antenna system 407 and transmitted to the satellite (not shown).

When receiving, the downlink signal from the satellite is received by the antenna system 407. The downlink signal as well as the crossed-over signal is filtered by transmit reject filter ("TRF") 408$a$, and then amplified and down converted by a low noise block ("LNB") 408$b$ to produce signal IFDOWN 408d. RF receiver 409a demodulates the converted signal into an analogue signal. The analogue signal is then converted to a digital signal by analogue-to-digital converter ("ADC") 409b. The digital signal is then demodulated by the spread spectrum demodulator 409c and further decoded by FEC decoder 409e. The decoded data is passed to micro controller 410 for further processing. The processed data is then routed to the attached telephone by data terminal equipment 411 through communication interface 412.

The mobile terminal is preferably able to operate in either or both the C-band and the Ku-band frequency ranges.

The mobile terminal equipment may have a global positioning satellite (GPS) receiver 414 to receive GPS signals and determine the terminal location. With the location information, the micro controller 410 can calculate information such as, for example, the antenna 407 pointing parameters (elevation, azimuth and tilt angle) that can facilitate the set-up of the terminal. The GPS timing signal may be used as a timing reference for the high stability clock 415 to generates a precise clock signal. The generated clock signal can be used as the reference clock to generate clock signals required by both analogue and digital circuits. The terminal location information may be reported to the network control centre for tracking purposes.

The terminal may communicate with a remote terminal with a large antenna that has diameter from 4.5 m upwards, typically about 13 m, and up to at least 32 m. In such a case, the terminal's transmission power can be lowered.

The terminal's transmission power may be in the range 0.25 to 18 W for C-Band, preferably 0.5 W to 8 W, and more preferably 5 W. This allows the use of a lower power-rated transceiver. This enables further reduction in the overall weight due to smaller heat sinks and power supplies.

The on-board power supply 413 may be a normal battery pack such as, for example, a laptop battery pack. The battery pack may be charged and powered by an external adapter such as those typically used with a laptop computer.

The antenna system 407 may be a low profile antenna, preferably a flat active high gain antenna. The antenna may be one piece, or a number of pieces that are able to be assembled, and may be foldable. Different types of antennas may be used including, but not limited to, fixed pointing antenna, electronic steering antenna by beam forming, electronic control tracking antenna, and so forth. The antenna 407 may be active or passive.

By being battery powered the terminal is portable, and able to operate almost anywhere. For example, it may operate on a vehicle, on a vessel, and in a remote location such case desert. It may be used for various application both such as, for example, Internet access, voice call, VoIP, satellite news gathering, and so forth.

Figure 5:
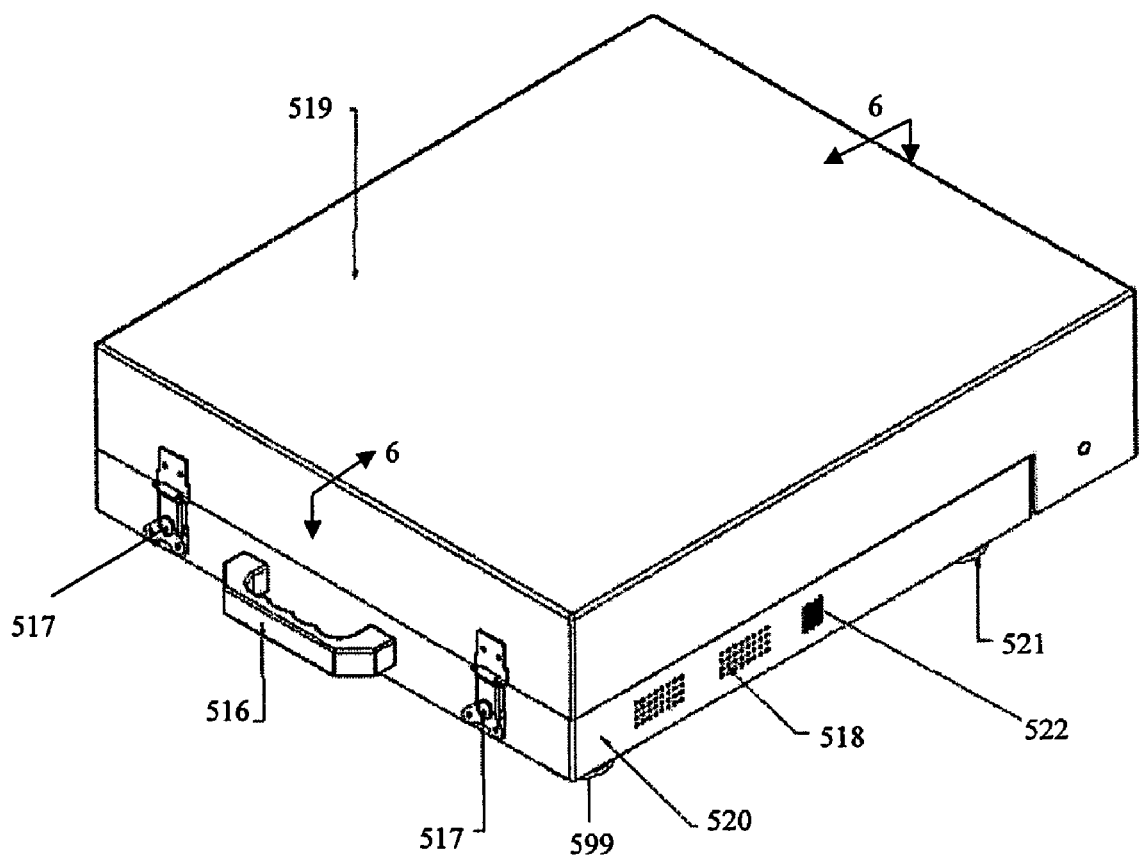
FIG. 5 illustrated a preferred form of terminal when the antenna is stowed.

FIGS. 5 to 8 illustrate one implementation of a mobile terminal. FIG. 5 shows the terminal when stowed. As can be seen, the antenna, when stowed, is within the terminal case, preferably without requiring folding or disassembly. In this way the antenna is stowed intact—in its in-use condition.

The terminal case may include: handle 516, locks 517, ventilation holes 518, protective cover 519, body 520, and height adjustable legs 521. Body 520 may be solid, hollow, or in the manner of a frame. The adjustable legs 521 may be at the rear of the body 520, with legs 599 at the front being not adjustable. Alternatively, all legs 521, 599 may be height adjustable. An RJ45 socket 522 is also provided. Antenna 607 is moveable between the stowed position of FIG. 5 to the in-use position of FIGS. 6 to 8.

Figure 6:
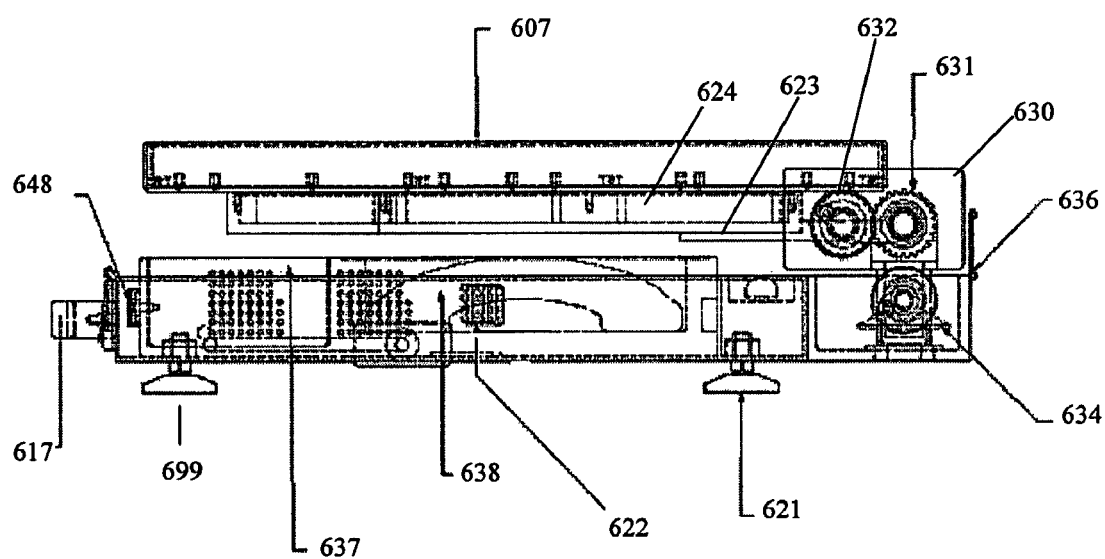
FIG. 6 is a partial cross-sectional view along the lines and in the direction of arrows 6-6 on FIG. 5.
Figure 7:
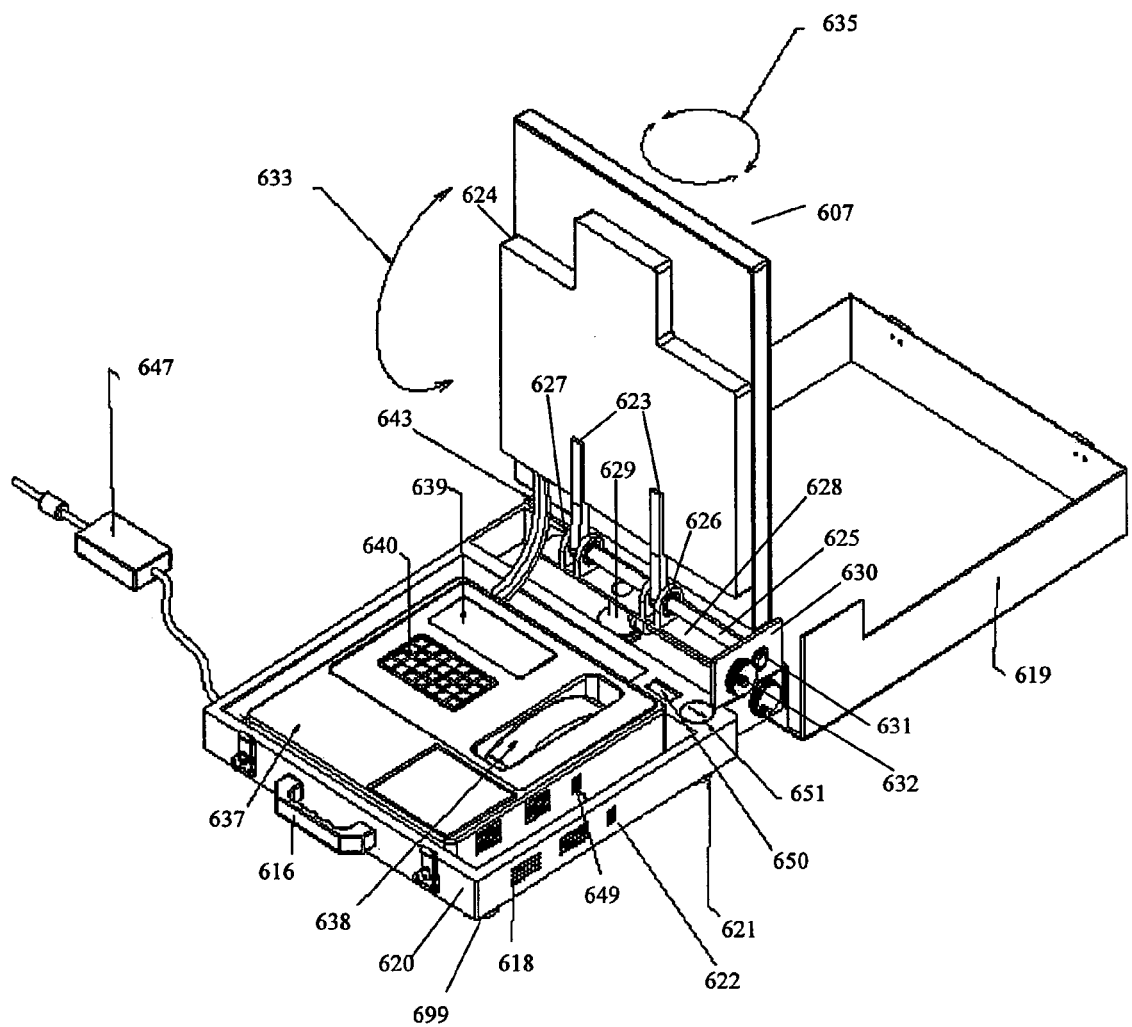
FIG. 7 illustrates a preferred form in an in-use situation.
Figure 8:
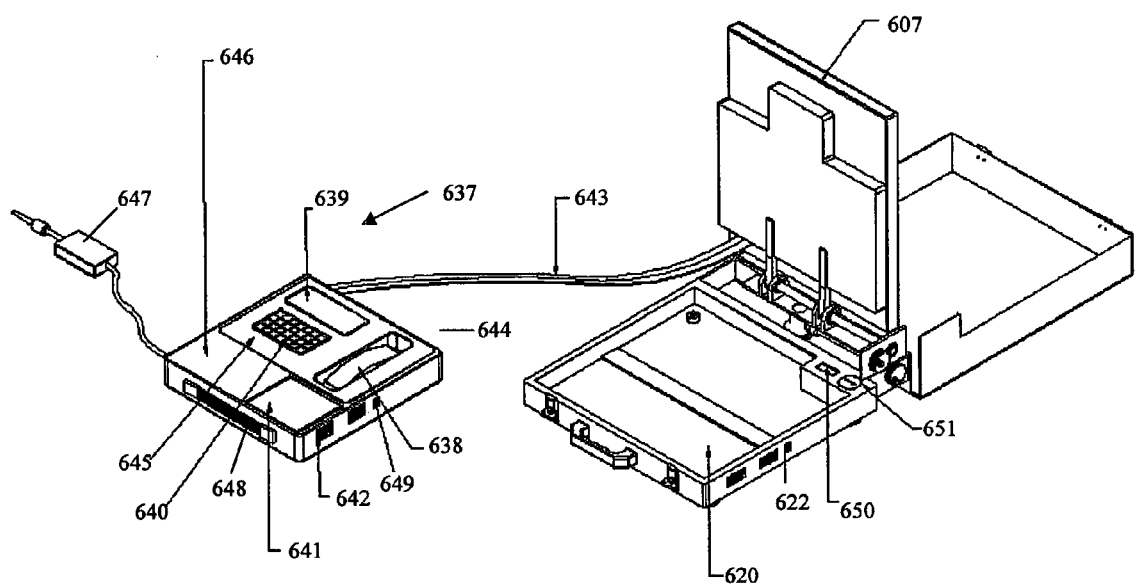
FIG. 8 illustrates a second preferred form in different in-use position.

In FIGS. 6 to 8 the same prefix number ("6") is used. Here, there is shown the antenna 607 mounted on an antenna plate 624. Securely but releasably attached to the antenna plate 624 are two antenna swing arms 623. The two antenna swing arms 623 are also securely attached to an antenna-mounting rod 625. The arms 623 are each mounted to rod 625 with U-shaped brackets 626, the brackets 626 having bearings 627 through which rod 625 passes for rotation relative thereto.

Brackets 626 are in turn mounted on a support plate 628 that is pivotally mounted to body 620 by a mounting block 629. At one end, plate 628 has a bracket 630 through which rod 625 passes. At its outer end, rod 625 has securely mounted thereon a first gear 631. Gear 631 is adapted to be driven by a second gear 632 to rotate rod 625 about its longitudinal axis to control the angle of elevation of the antenna 607, as is shown by arrow 633. A third gear is provided to engage plate 628 for adjustment of the azimuth angle of antenna 607, as is shown by arrow 635. Gears are driven by a motor (not shown) or a wheel fitted with a cranking handle (632).

The cover 619 is pivotally attached to body 620 by at least one hinge 636. Body 620 releasably contains an indoor unit 637. Indoor unit 637 includes one or more of: a handset 638, a display 639, a keypad 640, a battery 641, and a fan 642. The indoor unit 637 is operatively connected to antenna 607 by a cable or cables 643. The indoor unit 637 has a casing 644 that includes a cover 645 for the keypad 640, handset 638 and display 639; as well as a case 646, preferably splash proof or waterproof, for the modem 637. A power adapter 647, a second socket 649 and a handle 648 may also be provided. Indoor unit 637 may be used to control the elevation angle 633 and azimuth angle 635.

Mounted in body 620 are a bubble level 650 and a compass 651.

In this way, the apparatus can be placed at a desired location, leveled using adjustable legs 621 and 699 with bubble level 650 providing a visual indication of being level. Antenna 607 is moved to the in-use position and adjusted for azimuth by using compass 651 to ensure the pointing direction is generally correct. The elevation and azimuth are then adjusted manually or by using keypad 640 to input instructions to control the motor (not shown), until signal strength is maximized and signal-to-noise ratio is optimal. The required elevation and azimuth for the terminal are calculated and displayed by the microprocessor together with information of the desired satellite location and the present terminal position as obtained from the GPS receiver. Consequently, the communication link over satellite radio is established, and the terminal used to activate different applications. The body 620 acts as not only a mounting for the antenna 607, but also as a stabilizer so that, in use, the antenna 607 will be relatively stable and less affected by winds and other air currents.

The indoor unit 637 may also consist of the spread spectrum modem 409, microprocessor 410, RF modulator, RF receiver, physical communication interface, and some of the other components of FIG. 4

The terminal also can be connected to other equipment, such as a personal computer or laptop, data terminal equipment such as a router, a bridge and so forth, and an Ethernet switch, by different means, such as wireless LAN, Bluetooth, LAN cable, optical fibre, and so forth.

The indoor unit 637 can be separate from the body 620 and the antenna 607. For example, the indoor unit 637 may be used indoors while the antenna 607 and the body frame 620 remain outdoors. The connection between them may be made by cable 643 or wireless link.

Figure 9:
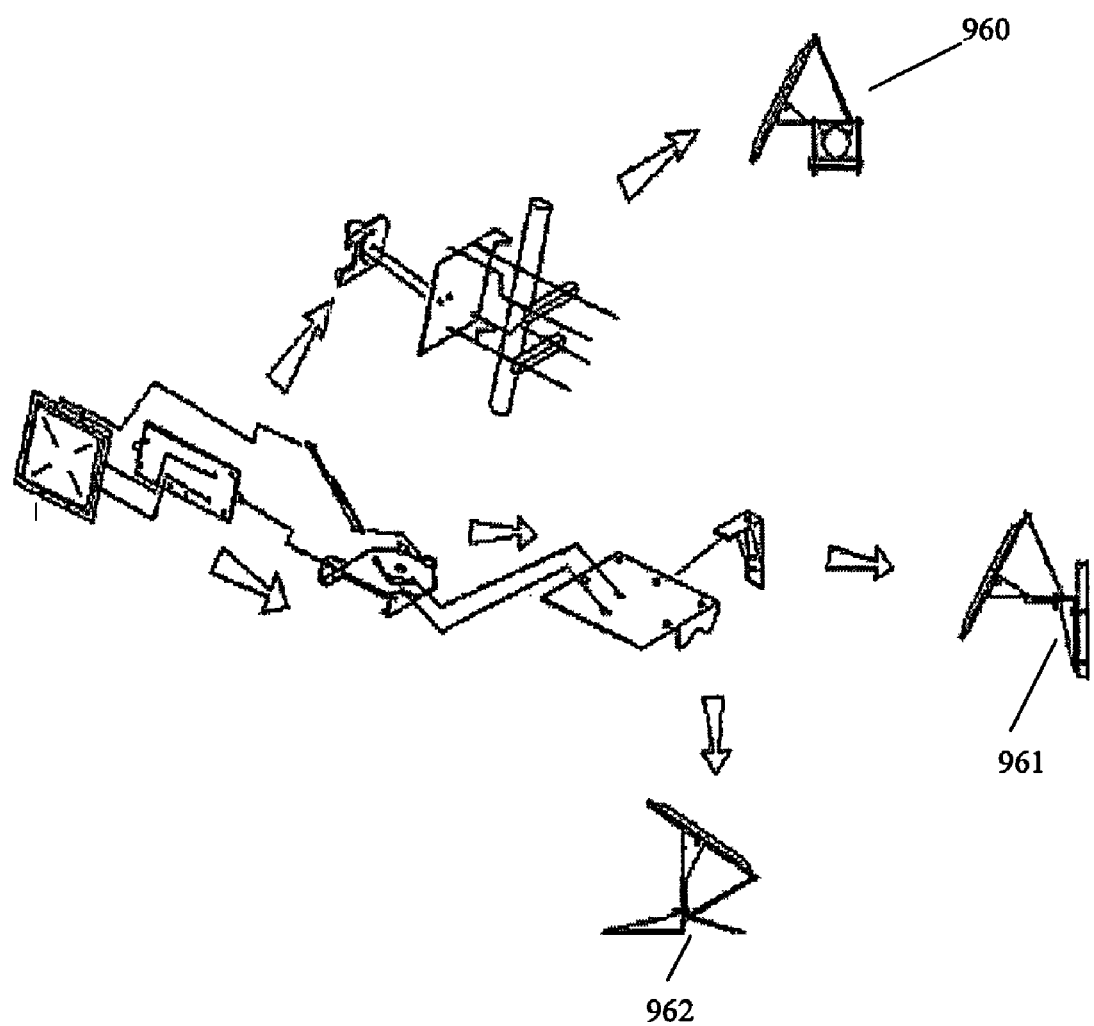
FIG. 9 illustrates other possible ways for the preferred form to be used.

FIG. 9 shows other possible embodiments where the antenna may be disconnected from the terminal and mounted on different objects, such as a pole 960, wall 961, or on the floor 962, depending on different requirements and/or environments.

Whilst there has been described in the foregoing description a preferred embodiment of the present invention, it will be understood by those skilled in the technology concerned that many variations or modifications in details of design, construction or operation may be made without departing from the present invention.

The invention claimed is:

1. A portable satellite terminal comprising:
   (a) a body;
   (b) a control unit within the body for controlling the terminal and terminal functions;
   (c) an antenna mounted to the body for movement relative to the body between a stowed position and an in-use position, the antenna being stowable within the body when not in use; and
   (d) when the antenna is in the in-use position, the antenna is adjustable relative to the body for elevation and azimuth.

2. The portable satellite terminal as claimed in claim 1, wherein the portable satellite terminal further comprises a cover pivotally attached to the body, and wherein the antenna is stowed in its in-use condition and does not require folding to be stowed within the body and the cover.

3. The portable satellite terminal as claimed in claim 1, wherein the portable satellite terminal further comprises a cover, and wherein the antenna is stowed in its in-use condition and does not require disassembly to be stowed within the body and the cover.

4. The portable satellite terminal as claimed in claim 1, wherein before being stowed within the body, the antenna is at least one of folded and dismantled.

5. The portable satellite terminal as claimed in claim 1, further including at least one of a bubble level, a compass, and at least one height-adjustable leg.

6. The portable satellite terminal as claimed in claim 1, further comprising:
   a display and
   a microprocessor for calculating a required elevation and azimuth and for displaying the required elevation and azimuth on the display.

7. The portable satellite terminal as claimed in claim 1, wherein the antenna is a flat panel active antenna.

8. The portable satellite terminal as claimed in claim 1, further comprising a rod and an antenna plate mounted on the rod, wherein the antenna is a flat, active, high-gain antenna and is mounted on the antenna plate, and wherein the rod is rotatable for adjustment of the elevation of the antenna.

9. The portable satellite terminal as claimed in claim 8, further comprising a support plate rotatably mounted relative to the body for azimuth adjustment, wherein the rod is mounted on the support plate.

10. The portable satellite terminal as claimed in claim 9, further comprising a mounting block, wherein the support plate is mounted on the mounting block, and the mounting block is mounted on the body, for enabling the rotational movement of the support plate for azimuth adjustment.

11. The portable satellite terminal as claimed in claim 8, further comprising at least one antenna swing arm connected to the antenna plate and operatively connected to the rod.

12. The portable satellite terminal as claimed in claim 1, wherein the body also acts as a stabilizer for the antenna when the antenna is in the in-use position.

13. The portable satellite terminal as claimed in claim 1, wherein the control unit is removable from the body and has a casing that is one of splashproof and waterproof 14. The portable satellite terminal as claimed in claim 1, wherein the control unit includes at least one of a global positioning satellite receiver, a high stability clock, a digital modem, an analogue modulator, an analogue demodulator, a physical communication interface, a handset, a display, a keypad, a battery, and a fan.

15. The portable satellite terminal as claimed in claim 14, wherein the digital modem is a spread spectrum modem, the global positioning satellite receiver provides a timing reference for the high stability clock, and the high stability clock generates a precise clock signal based on the timing reference.

16. The portable satellite terminal as claimed in claim 1, further including an RF transceiver, a microcontroller, and data terminal equipment.

17. The portable satellite terminal as claimed in claim 1, wherein the portable satellite terminal further comprises a cover, and wherein when the antenna is stowed within the body and the cover is in a closed position, the terminal is of a weight of less than 25 kg and the cover has a top surface area of less than 2 square meters.

18. The portable satellite terminal as claimed in claim 17, wherein the weight is selected from the group consisting of: in the range 0.8 kg to 20 kg, in the range 2.5 kg to 8 kg, and 6 kg.

19. The portable satellite terminal as claimed in claim 17, wherein the top surface area is selected from the group consisting of: in the range 0.06 to 0.3 square meters, in the range 0.45 m×0.6 m to 1.21 m×1.66 m, and 0.4 m×0.55 m.

20. The portable satellite terminal as claimed in claim 1, wherein the portable satellite terminal transmits a radio frequency signal having a power selected from the group consisting of: 0. 25 watts at the antenna input, in the range 0.5 watt to 8 watts at the antenna input, and 5 watts at the antenna input.

21. The portable satellite terminal as claimed in claim 1, wherein the portable satellite terminal is configured to accommodate the C-band and Ku-band frequency ranges.

22. The portable satellite terminal as claimed in claim 1, wherein the portable satellite terminal is of a height selected from the group consisting of: in the range 0.18 m to 0.08m, and 0.16 m.

* * * * *